(12) United States Patent
Jangbarwala

(10) Patent No.: US 7,625,540 B2
(45) Date of Patent: *Dec. 1, 2009

(54) FLUORINE REMOVAL BY ION EXCHANGE

(75) Inventor: Juzer Jangbarwala, Chino-Hill, CA (US)

(73) Assignee: Edwards Vacuum, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/148,756

(22) PCT Filed: Dec. 1, 2000

(86) PCT No.: PCT/US00/32726

§ 371 (c)(1),
(2), (4) Date: Sep. 3, 2002

(87) PCT Pub. No.: WO01/40117

PCT Pub. Date: Jun. 7, 2001

(65) Prior Publication Data

US 2003/0206846 A1    Nov. 6, 2003

Related U.S. Application Data

(60) Provisional application No. 60/168,962, filed on Dec. 3, 1999, provisional application No. 60/177,827, filed on Jan. 25, 2000.

(51) Int. Cl.
*C02F 1/42* (2006.01)
*C01B 7/19* (2006.01)
*B01D 53/14* (2006.01)
*B01J 49/00* (2006.01)
*B01J 47/00* (2006.01)

(52) U.S. Cl. .................. 423/241; 423/240 S; 423/483; 423/488; 210/683; 210/670; 210/673; 95/233

(58) Field of Classification Search ............. 423/240 R, 423/241, 483, 488; 210/683, 670, 676, 673, 210/675; 95/233, 149; 422/171, 178, 160, 422/161

See application file for complete search history.

(56) References Cited

U.S. PATENT DOCUMENTS 3,816,077 A * 6/1974 Fuller et al. ................. 422/189

(Continued)

FOREIGN PATENT DOCUMENTS

DE    2300129    1/1973

(Continued)

OTHER PUBLICATIONS

English abstract and drawing for DE 2300129 (Jul. 1974).*

*Primary Examiner*—Ngoc-Yen M Nguyen
(74) *Attorney, Agent, or Firm*—Mary Kristin Nicholes; Ting-Mao Chao

(57) ABSTRACT

A method for removing fluorine gas from a selected environment comprises contacting the fluorine gas with water to generate a solution of hydrofluoric acid and contacting the solution of hydrofluoric acid with an ion exchange resin having an active state operative to exchange selected ions therein for fluoride ions in the solution. The apparatus (200) may include a dual resin setup (222, 223) such that one of the ion-exchange resin can be in the service cycle while the other of the ion-exchange resins undergoes the regeneration and rinse/refill cycles.

14 Claims, 10 Drawing Sheets

U.S. PATENT DOCUMENTS

| | | | |
|---|---|---|---|
| 4,734,200 A * | 3/1988 | Berry | 210/677 |
| 4,886,653 A * | 12/1989 | Gasper et al. | 423/478 |
| 4,965,061 A | 10/1990 | Berry et al. | |
| 5,396,018 A * | 3/1995 | Hommeltoft | 585/724 |
| 5,597,545 A * | 1/1997 | Chang et al. | 423/484 |
| 5,649,985 A | 7/1997 | Imamura | |
| 5,730,779 A | 3/1998 | Chernvakov et al. | |
| 5,876,685 A | 3/1999 | Krulik et al. | |
| 6,033,808 A * | 3/2000 | Salmon et al. | 429/322 |
| 6,759,018 B1 * | 7/2004 | Arno et al. | 423/210 |

FOREIGN PATENT DOCUMENTS

| | | |
|---|---|---|
| JP | 50-44649 | 4/1975 |

\* cited by examiner

FLUORINE REMOVAL BY ION EXCHANGE

CROSS-REFERENCE TO RELATED APPLICATIONS

This application claims the benefit of U.S. Provisional Application No. 60/168,962, filed Dec. 3, 1999, and U.S. Provisional Application No. 60/177,827, filed Jan. 25, 2000.

FIELD OF THE INVENTION

The present invention generally relates to the removal and collection of undesirable wastes produced as byproducts of industrial processes. More particularly, the present invention is directed to converting fluorine gas in chemical vapor used in semiconductor manufacturing processes to a disposable form thereof. In particular, the present invention is directed to a method and apparatus for use in removing and collecting fluorine that is produced in industrial processes. Additionally, the present invention includes a system using the method and apparatus of the present invention in industrial processes requiring the removal and collection of fluorine.

BACKGROUND OF THE INVENTION

Semiconductor manufacturing processes generally involve the use of Chemical Vapor Deposition during processing of dielectrics and metals. Certain parts of the manufacturing process also etch semiconductor components with chemical vapor, which typically consists of perfluorinated compounds (PFCs) and fluorine gas. The steps of the manufacturing process are typically achieved by specific tools, which are generally cleaned after a number of cycles. In many industrial processes, such as semiconductor manufacturing, some amounts of fluorine gas remain unutilized.

Fluorine gas is highly corrosive, and both elemental fluorine and the fluoride ion can be highly toxic. Accordingly, it is desirable to safely and efficiently remove and properly dispose of fluorine and/or fluoride used in industrial processes, and in semiconductor manufacturing processes in particular.

Current technologies for fluorine removal focus on scrubbing the fluorine gas with simple air scrubbers to produce a constant bleed of hydrofluoric acid (HF), which is generally sent to a manufacturing facility's Acid Waste Neutralization (AWN) system for processing and disposal. Because HF is a weak acid with a $pK_a$ of 3.16, the transformation of $F_2$ to HF is discouraged at low pH values. This becomes problematic for scrubbers, as pH becomes the controlling mechanism for bleed volumes and consequently for concentration of HF. Further, increasing pH, such as by addition of alkali, poses further problems because $OF_2$, an undesirable byproduct, can be produced in an alkaline environment in the presence of hypofluorous acid (HOF), which is also formed during the reaction of $F_2$ with water. Additionally, despite operating at maximum allowable concentrations of HF in the scrubber, the HF reaching the AWN is generally too dilute for optimal operation of fluorspar ($CaF_2$) precipitation systems. Further, large amounts of chemicals are consumed in conventional $CaF_2$ precipitation systems. Additionally, the sludge volume is very high due to the high level of hydration, requiring excessive $CaF_2$ sludge hauling.

Accordingly, there remains a need to provide a new and improved method and apparatus for removing and collecting fluorine and/or fluoride. There further remains a need for a system for removing fluorine which has a low operating cost and which generates a concentrated end product that can be hauled away economically. The present invention is directed to meeting these needs.

SUMMARY OF THE INVENTION

It is an object of the present invention to provide a new and useful method for removing fluorine gas from a selected environment.

It is another object to provide a low operating cost method for removing and disposing of undesirable byproducts of industrial processes.

It is yet another object of the present invention to provide a new and useful apparatus for removing and collecting fluorine and/or fluoride in selected manufacturing processes.

A still further object of the present invention is to provide an apparatus which generates a concentrated fluoride end-product that can be economically disposed of and that does not require excessive sludge hauling.

Yet another object of the present invention is to provide a system that removes fluorine gas from industrial manufacturing processes and provides a disposable end-product thereof.

According to the present invention, a method is provided for removing fluorine gas from a selected environment. The method comprises the steps of contacting the fluorine gas from the environment with a selected quantity of water, thereby to generate a solution of hydrofluoric acid, and contacting the solution of hydrofluoric acid with an ion-exchange resin having an active state operative to exchange selected ions therein for fluoride ions in the solution when in contact therewith. A continuous stream of water may be contacted with a continuous stream of fluorine gas, such as by injecting the fluorine gas into the water. Where the selected environment includes silica particles, the method may include the step of filtering the solution of hydrofluoric acid through a porous strong base anion resin thereby to remove silica particles disposed in the solution.

The step of contacting the solution with the ion-exchange resin may be accomplished by passing the solution of hydrofluoric acid through a resin vessel in which the ion-exchange resin is disposed. The ion-exchange resin may be a weak-base anion exchange resin or a strong base anion exchange resin, and is preferably a crosslinked poly-4-vinylpyridine resin or a derivative thereof, and more preferably a Reillex™ 402 or Reillex™ 425 resin. The method may include doping the ion-exchange resin with an electron donor catalyst, such as palladium or titanium. The step of doping may be accomplished by contacting the ion-exchange resin with a salt of the catalyst and thereafter contacting the ion-exchange resin with an oxidizing agent.

The ion-exchange resin may be capable of chemically shifting between the active state and an exhausted state operative to exchange the fluoride ions in the ion-exchange resin for the selected ions contained in a regenerant solution, such as an ammonium hydroxide solution, when in contact therewith, wherein the method may include the step of regenerating the ion-exchange resin by contacting the ion-exchange resin with the regenerant solution thereby to form a selected regenerant waste product containing the fluoride ions, such as ammonium fluoride. The method may include the step of rinsing the ion-exchange resin with a rinse solution, such as de-ionized water, after the step of regenerating the ion-exchange resin. The rinse solution may thereafter be used to replenish the regenerant solution. The regenerant waste product may be collected in a storage vessel.

The solution of hydrofluoric acid may be cooled, such as by use of a heat-exchange apparatus, prior to the step of contacting the solution with the ion-exchange resin. A reducing agent may be added to the solution of hydrofluoric acid prior to the step of contacting the solution of hydrofluoric acid with the ion-exchange resin.

The present invention also relates to an apparatus for use in removing fluorine from a selected environment. The apparatus comprises an inlet in communication with the selected environment and operative to provide fluorine gas therefrom, a conduit in communication with the inlet and adapted to receive fluorine gas therefrom and operative to transport an aqueous solution therethrough, a resin vessel in fluid communication with the conduit and operative to receive the aqueous solution therefrom, and an ion-exchange resin disposed in the resin vessel and adapted to contact the aqueous solution. The ion-exchange resin has an active state operative to exchange selected ions therein for fluoride ions in the aqueous solution when in contact therewith.

The inlet may include an injector, such as a vacuum pump or an eductor, that is operative to inject the fluorine gas into the conduit. The resin vessel may receive the aqueous solution in a fluid compartment thereof and further include a chamber proximate to the fluid compartment that is sized and adapted to permit a gas, such as $N_2$, disposed in the aqueous solution to separate therefrom and enter the chamber, which may be in communication with a scrubber operative to receive the gas from the chamber.

The ion-exchange resin for use in the apparatus is similar or identical to that for use in the method of the invention. When the ion-exchange resin is capable of chemically shifting between the active state and the exhausted state, the apparatus may include a regenerant source vessel adapted to receive the regenerant solution. The regenerant source vessel is in fluid communication with the resin vessel and operative to selectively provide the regenerant solution to the resin vessel. A rinse solution source in fluid communication with the resin vessel may selectively provide a rinse solution to the resin vessel. A regenerant waste outlet in fluid communication with the resin vessel may be adapted to receive therefrom a regenerant waste solution containing fluoride ions. A regenerant waste vessel may be further in fluid communication with said regenerant waste outlet to receive a selected quantity of the regenerant waste solution. A heat-exchange apparatus may be disposed proximate to the conduit and operative to transfer thermal energy away from the conduit. A reducing agent source in communication with the conduit may selectively introduce a reducing agent into the conduit, such as via a positive displacement metering pump.

The present invention also relates to an apparatus for use in removing fluorine from a selected environment that comprises first and second ion-exchange resins disposed in respective first and second resin vessels. A valve system includes a plurality of valves associated with a plurality of fluid pathways interconnecting selected ones of an inlet, a conduit, the first and second resin vessels, a regenerant source vessel, a rinse solution source and a regenerant waste outlet. The valve system includes various valve states permitting fluid flow. A controller may be operative to move the valve system into its respective states, and a pH monitor may generate a signal when the aqueous solution reaches a target pH value.

The present invention further relates to an apparatus for use in removing fluorine from a selected environment, comprising an inlet operative to provide fluorine gas from the environment to the resin vessel, in which is disposed an ion-exchange resin containing a selected volume percentage of water. The ion-exchange resin exchanges selected ions therein for fluoride ions generated by contact of the fluorine gas with the ion-exchange resin having the volume percentage of water. A heat-exchange apparatus may be disposed proximate to the resin vessel.

Finally, the present invention is directed to an apparatus for use in removing fluorine from a selected environment, comprising a scrubber in communication with the inlet and adapted to receive fluorine gas therefrom. The scrubber is operative to contact the fluorine gas with water thereby to form a solution of hydrofluoric acid. The resin vessel receives the solution from the scrubber, and the ion-exchange resin disposed in the resin vessel exchanges selected ions in the ion-exchange resin for fluoride ions in the solution when in contact therewith.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIG. 1b is a diagrammatic view of optional steps of the method of FIG. 1a;

DETAILED DESCRIPTION OF THE EXEMPLARY EMBODIMENTS

The present invention provides an efficient method, apparatus and system for removing fluorine gas from industrial manufacturing processes. It should be understood, however, that the present invention may be utilized in virtually any situation in which fluorine and/or fluoride collection and removal is desirable.

Generally, fluorine in use in semi-conductor manufacturing processes is mixed in a vacuum pump with a carrying gas, such as $N_2$ or other inert gases, preferably in a ratio of 40 liters of $N_2$ per 1.5 liters $F_2$. In the method of the present invention, this gas mixture is injected into an aqueous solution thereby to generate HF, which is believed to occur according to the following reactions I and II:

Further, HF is a weak acid, with a $pK_a$ of 3.16. Accordingly, at low pH values, the transformation of $F_2$ to HF is discouraged. Adjustment of pH, such as by addition of alkali, poses the additional problem of generating undesirable $OF_2$ which can be produced under alkaline conditions according to reaction III as follows:

$$F_2 + HOF \rightleftharpoons OF_2 + HF \quad \text{(III)}$$

Accordingly, in order to operate an optimum $F_2$ removal/abatement device it is desirable to reduce the HOF, such as by adding a reducing agent, and to keep a pH environment preferably of between 5 and 7. Further, because the reaction of $F_2$ with water may be exothermic, it is further desirable to dissipate heat generated thereby, such as through the use of a heat exchange device.

Figure 1A:
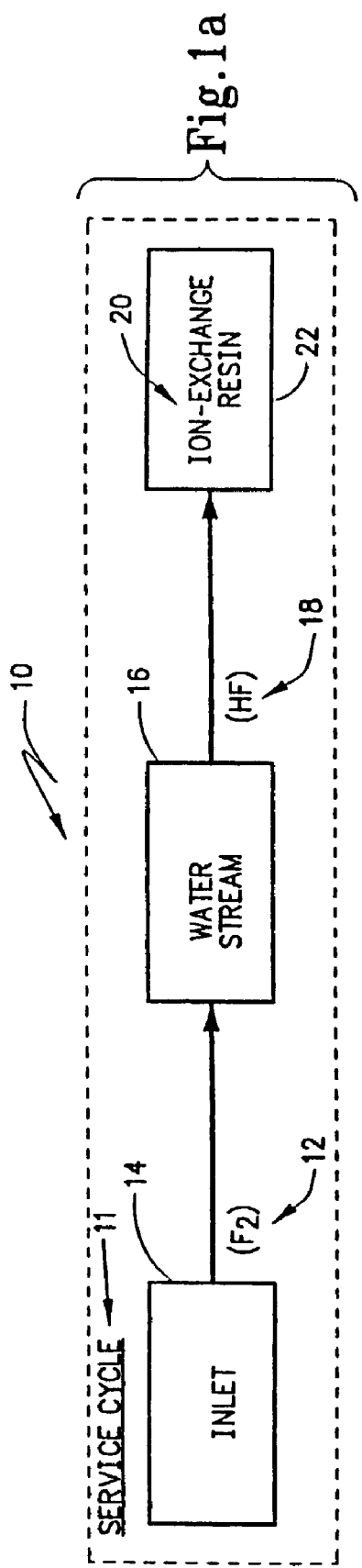
FIG. 1a is a diagrammatic view of the method according to the present invention.

As shown in FIG. 1a, then, the general method 10 of the present invention comprises service cycle 11, which includes injecting $F_2$ gas 12, preferably provided by an inlet 14, into a water stream 16, which is preferably a recirculating, or closed-loop, stream. A closed loop allows for higher flow rates and accordingly more efficient operation. HF 18 generated by the reaction of $F_2$ with water is passed through an ion-exchange resin 20, which is preferably disposed in a resin vessel 22. HF that contacts the ion-exchange resin 20 undergoes ion-exchange such that fluoride ions, $F^-$, are captured by ion-exchange resin 20. Alternatively, $F_2$ gas 12 may be injected directly into contact with ion-exchange resin 20 when the resin is of a type which has a high water volume percentage and is stable to oxidation by $F_2$. In this case, $F_2$ gas 12 reacts with the moisture in the ion-exchange resin 20, thereby to generate HF 18 which undergoes ion-exchange with the functional groups of ion-exchange resin 20.

The preferred ion-exchange resin is a crosslinked poly-4-vinylpyridine resin and derivatives thereof, such as those manufactured by Reilly Industries, Inc., 1500 South Tibbs Avenue, Indianapolis, Ind., under the tradenames Reillex™ 402 and 425. The pyridine functional groups of these resins are highly resistant to attack by oxidizing and reducing agents and have an unusually high capacity for HF. Further, these resins resist oxidation by hydrogen peroxide, $H_2O_2$, postulated to be formed by the reaction of HOF and $H_2O$. It should be understood, however, that other ion-exchange resins may be utilized in accordance with the present invention. In particular, the present invention contemplates resins with a weak base anion functionality, such as those having tertiary amines as main functional groups and either styrene or acrylic backbones. Additionally, the present invention contemplates resins having a strong base anion functionality, such as those having quaternary amines as main functional groups and either styrene or acrylic backbones. Exemplary weak base anion and stong base anion resins include those manufactured by Purolite®, located in Bala Cynwyd, Pa., such as the A-860, A-845, A-100, A-870, A-600, A-510, A-500, A-500P, A-400, A-300, A-300E, A-200, and A-850 Purolite® ion-exchange resins.

Additionally, the present invention contemplates the use of resins which have been doped, or impregnated, with a catalyst to increase the rate of conversion of $F_2$ to $F^-$. The use of a catalyst may be desirable when the system conditions favor $F_2$ in the $F_2 \rightleftharpoons 2F^-$ equilibrium, such as under low pH, for example, or when a scrubber is not present in the system. The preferred catalyst is an electron donor, such as palladium or titanium metal, which accelerates the conversion of fluorine to fluoride. A resin may be doped with such a catalyst by, for example, contacting the resin with a palladium chloride salt solution and thereafter contacting the resin with an oxidizer thereby to precipitate the palladium metal in stoichiometric amounts. It should be appreciated that resins resistant to oxidation, such as the crosslinked poly-4-vinylpyridine resins and derivatives thereof discussed above, are particularly suitable for catalyst doping by this method.

It should be appreciated that other types of media may be substituted for the ion-exchange resin of the present invention. In particular, acid absorption or neutralizing media that sacrificially hydrates or neutralizes hydrofluoric acid, such as limestone or other calcium compounds, may be employed. However, such media are less preferred relative to media such as ion-exchange resins, which may be efficiently regenerated.

Figure 1B:
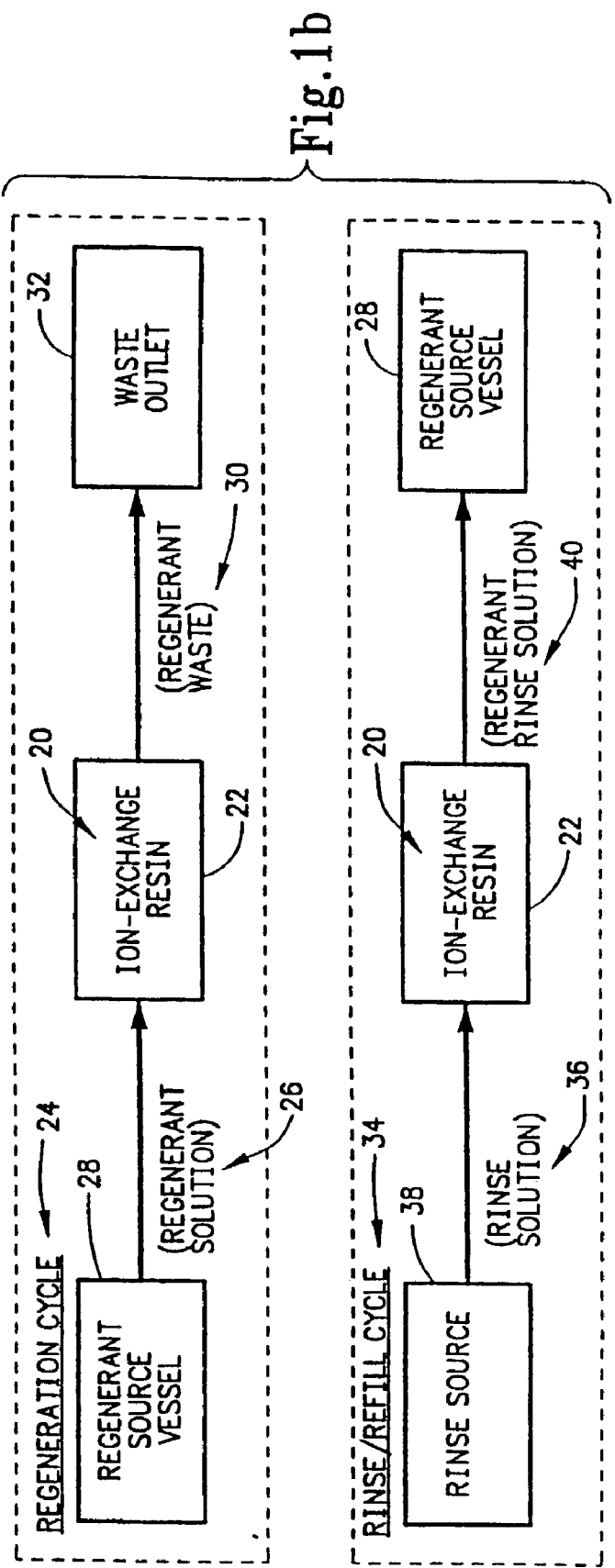

When an ion-exchange resin is utilized, the method of the present invention may additionally include a regeneration cycle 24 and a rinse/refill cycle 34, as shown in FIG. 1b. The regeneration cycle 24 includes providing a regenerant solution 26, preferably from a regenerant source vessel 28. Regenerant solution 26, which is preferably ammonium hydroxide, $NH_4OH$, is passed into resin vessel 22 and into contact with ion-exchange resin 20. Ion-exchange resin 20 undergoes ion-exchange with regenerant solution 26 thereby to form a regenerant waste 30 containing concentrated fluoride ion, $F^-$. When $NH_4OH$ is used as the regenerant solution 26, regenerant waste 30 contains $NH_4F$ salt. Regenerant waste 30 is then passed to waste outlet 32, whereby regenerant waste 30 may be either collected, such as in a dedicated container, or sent down a dedicated collection drain.

The rinse/refill cycle 34 includes providing a rinse solution 36, preferably de-ionized water, from a rinse source 38 such as a water inlet. Rinse solution 36 is passed through resin vessel 22 and in contact with ion-exchange resin 20, thereby to rinse any remaining regenerant solution 26 from resin vessel 22. Regenerant rinse solution 40 formed by rinsing resin vessel 22 may then be passed to regenerant source vessel 28, thereby to refill regenerant source vessel 28 with an aqueous solution whose concentration may thereafter be adjusted, such as by addition of concentrated $NH_4OH$ to form the desired regenerant solution 26.

The method 10 of the present invention may additionally include one or more of the steps of cooling the water stream 16 to dissipate heat generated by the reaction of $F_2$ with water, monitoring the oxidation-reduction potential of water stream 16, adding a reducing agent to water stream 16 to assure decomposition of HOF formed during the reaction of $F_2$ with water, removing carrying gases provided along with $F_2$ gas 12 by inlet 14, monitoring pH for an indication that ion-exchange resin 22 is exhausted, signaling for the beginning of regeneration cycle 24, monitoring the concentration of regenerant solution 26 and adjusting the concentration of regenerant solution 26 to regeneration levels, such as by pumping concentrated solution into regenerant source vessel 28. In the case where $F_2$ gas 12 is pumped directly into resin vessel 22, the method may include a further step of hydrating ion-exchange resin 20 during service cycle 11, such as by providing de-ionized water to resin vessel 22 to replace water used in reaction with $F_2$, or by providing moisture, such as in vapor form, to resin vessel 22.

Figure 2A:
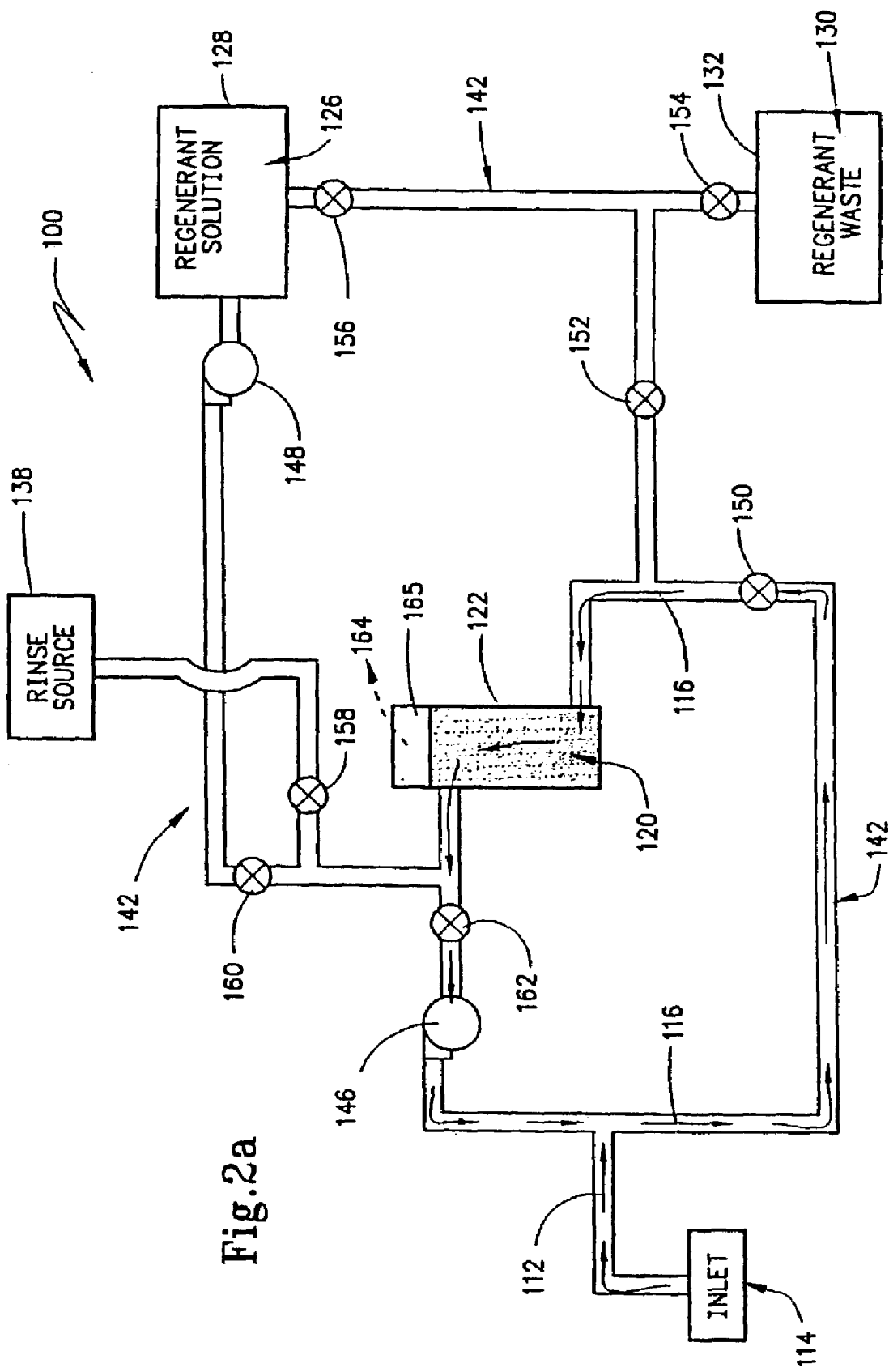
FIG. 2a is a diagrammatic view of a first embodiment of an apparatus according to the present invention, showing the service cycle in operation.
Figure 2B:
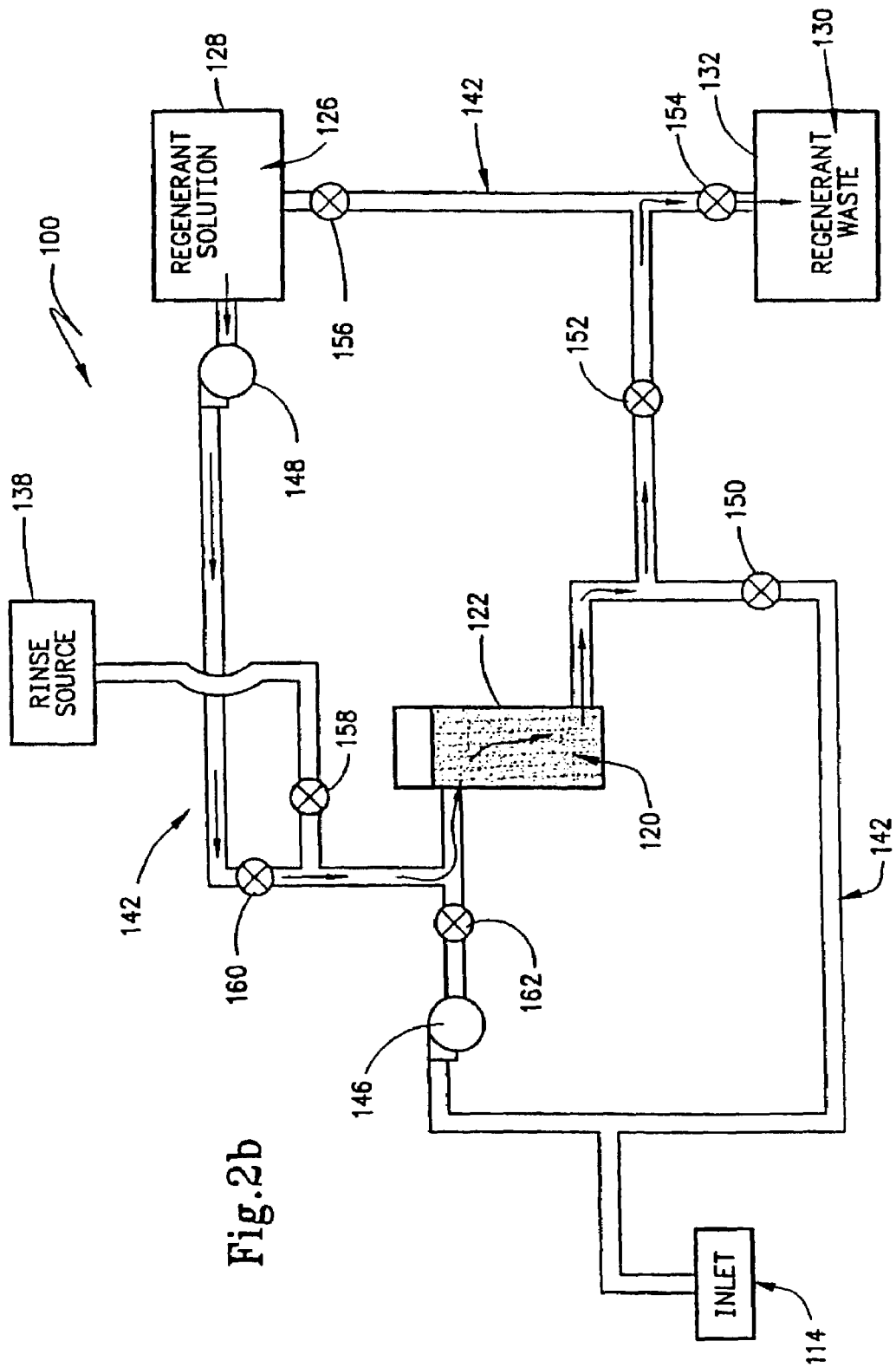
FIG. 2b is a diagrammatic view of the apparatus according to FIG. 2a, showing a regeneration cycle in operation.
Figure 2C:
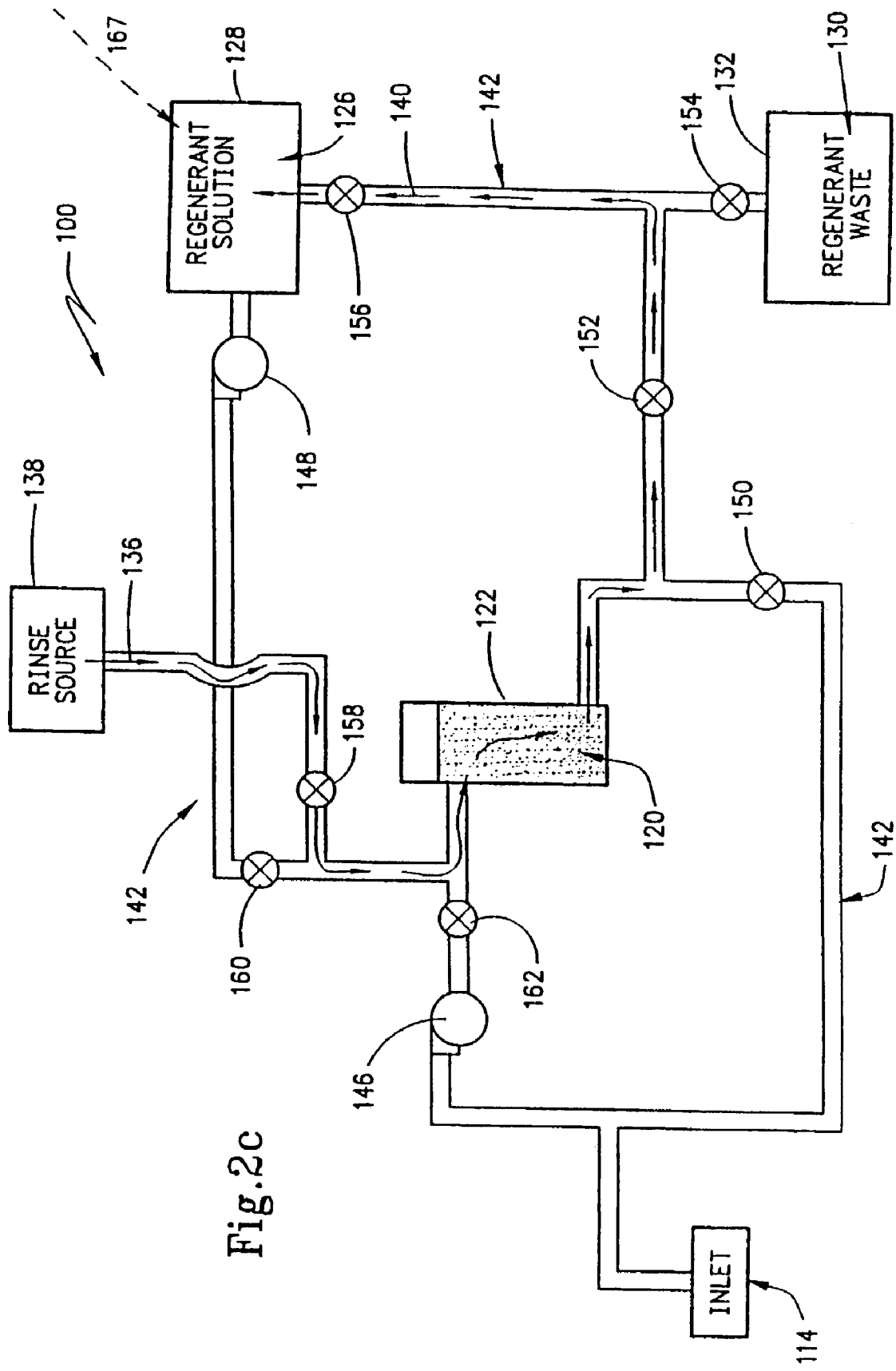
FIG. 2c is a diagrammatic view of the apparatus of FIGS. 2a and 2b, showing a rinse/refill cycle in operation.

A general embodiment of the apparatus 100 according to the present invention is shown in FIGS. 2a-2c. Here, apparatus 100 includes inlet 114, preferably a vacuum pump or eductor, resin vessel 122 having ion-exchange resin 120 disposed therein, regenerant source vessel 128 having regenerant solution 126 disposed therein, rinse source 138 operative to provide a rinse solution, and waste outlet 132, here shown as a container adapted to receive regenerant waste 130. Inlet 114, resin vessel 122, regenerant source vessel 128, rinse source 138, and waste outlet 132 are fluidly connected by conduit 142, which is adapted to receive a water stream.

Pumps 146 and 148 are disposed in conduit 142, and each have an on state wherein they are operative to pump fluid through conduit 142 and an off state wherein they do not pump fluid. Valves 150, 152, 154, 156, 158, 160 and 162 are disposed in conduit 142 and are operative to move between a closed state preventing fluid flow therethrough and an open state allowing fluid flow therethrough.

FIG. 2a shows the service cycle for apparatus 100. Here, $F_2$ gas 112 is injected from inlet 114 into water stream 116, which is a recirculating, or closed-loop, stream. Pump 146 is operative to pressurize and circulate water stream 116 in conduit 142. Valves 150 and 162 are open, while the remaining valves are closed. HF laden water in water stream 116 flows through resin vessel 122 where it undergoes ion-exchange with ion exchange resin 120. Preferably, water stream 116 flows through resin vessel 122 in an up-flow direction, creating an expanded, or fluidized, resin bed. Carrying gas 164, such as $N_2$, is removed at top of resin vessel 122 which has a free volume 165 capable of allowing carrying gas 164 to separate from the water stream 116, where it can then be directed to a location for further processing, such as by a scrubber.

When ion-exchange resin 120 is at full capacity of $F^-$, a regeneration cycle begins as shown in FIG. 2b. Here, valves 150 and 162 are closed and pump 146 is turned off. Preferably, inlet 114 is also closed or turned off as appropriate. Valves 160, 152 and 154 are opened and pump 148 is turned on. Regenerant solution 126, preferably ammonium hydroxide, is pumped from regenerant source vessel 128 and through resin vessel 122 which undergoes ion-exchange with ion-exchange resin 120, thereby to produce regenerant waste 130. When ammonium hydroxide solution is used as the regenerant solution 126, ammonium fluoride solution is formed as the regenerant waste 130 resulting from regeneration of ion-exchange resin 120. The concentration, as well as rate of flow through resin vessel 122, of regenerant solution 126 is preferably adjusted according to the concentration of regenerant waste 130 that is desired. Preferably, regenerant waste 130 is a concentrated stream of ammonium fluoride that is easily disposed of without requiring excessive sludge hauling.

Once ion-exchange resin 122 has been regenerated, a rinse cycle begins, as shown in FIG. 2c. Here, valves 160 and 154 are closed and valves 156 and 158 are opened, while pump 148 is turned off. Rinse solution 136, provided by rinse source 138, passes through resin vessel 122 to rinse any remaining regenerant solution 126 therefrom. Regenerant rinse solution 140 then flows to regenerant source vessel 128, where regenerant rinse solution 140 may be recycled to form a new regenerant solution 126, such as by adding concentrated regenerant 167, preferably ammonium hydroxide, to regenerant source vessel 128 until a desired regeneration concentration of regenerant solution 126 is achieved. To the extent understood by the ordinarily skilled artisan, a concentration monitor/control may be used to automatically adjust the concentration of $NH_4OH$ to regeneration levels by pumping concentrated solution to regenerant source vessel 128 as desired.

Once the rinse/refill cycle has completed, valves 152, 156 and 158 are closed and valves 150 and 162 are opened, pump 146 is turned on, and if necessary inlet 114 is turned on or opened as appropriate, thereby to begin the service cycle again.

The various on/off and open/closed states of valves and pumps during the operation cycles for apparatus 100 is summarized in Table 1 below:

TABLE V

|  | Service Cycle | Regeneration Cycle | Rinse/Refill Cycle |
|---|---|---|---|
| Pump 146 | ON | OFF | OFF |
| Pump 148 | OFF | ON | OFF |
| Valve 150 | OPEN | CLOSED | CLOSED |
| Valve 152 | CLOSED | OPEN | OPEN |
| Valve 154 | CLOSED | OPEN | CLOSED |
| Valve 156 | CLOSED | CLOSED | OPEN |
| Valve 158 | CLOSED | CLOSED | OPEN |
| Valve 160 | CLOSED | OPEN | CLOSED |
| Valve 162 | OPEN | CLOSED | CLOSED |

A more preferred embodiment of the present invention is shown in FIGS. 3a-3d. Here, apparatus 200 includes a dual resin setup, wherein two ion-exchange resins are utilized such that one of the ion-exchange resins can be in the service cycle while the other of the ion-exchange resins undergoes the regeneration and rinse/refill cycles. Thus, it becomes unnecessary to interrupt the fluorine removal/abatement process, because a service cycle can be continuously performed by the apparatus.

Apparatus 200 includes a vacuum pump 214, which is operative to supply $F_2$ gas 212 to a conduit 242 which interconnects various components of the apparatus 200. Preferably, a heat exchanger 268 is disposed in thermal communication with conduit 242 immediately downstream of juncture 270 where $F_2$ gas 212 is injected into a water stream 216 circulating through conduit 242. Additionally, apparatus 200 preferably includes a reducing agent source 272 in fluid communication with conduit 242 and operative to provide a reducing agent 274 which is capable of reducing HOF which may be formed by the reaction of $F_2$ and water. To the extent understood by the ordinarily skilled artisan, the addition of reducing agent 274 from reducing agent source 272 into water stream 216 is preferably controlled by an oxidation-reduction potential (ORP) monitor, which signals for reducing agent 274 to be pumped from reducing agent source 272 when an oxidation-reduction potential is detected. A mixer 276 is also preferably provided to optimally mix reducing agent 274 into water stream 216. It should be understood that the present invention contemplates the use of integrated heat-exchangers and mixers that may be available in the art, such that heat exchanger 268 and mixer 276 may be disposed in one apparatus. Additionally, a pH monitor 278 is preferably provided, whereby the pH monitor is capable of monitoring the pH of the water stream 216 and operative to provide a signal when the pH decreases below a selected threshold.

First resin vessel 222 and second resin vessel 223 are provided in fluid communication with conduit 242, and each resin vessel contains ion-exchange resin 220 and 221, respectively. Rinse source 238 is further in fluid communication with conduit 242, and is operative to provide de-ionized water 236. Regenerant source vessel 228 is operative to provide dilute ammonium hydroxide 226. Waste outlet 232 is operative to receive ammonium fluoride regenerant waste 230 resulting from regeneration of either of ion-exchange resins 220 or 221.

Pumps 244, 246 and 248 are disposed in conduit 242 and are operative in an on state to pump fluid through conduit 242. It should be understood that pump 244 may be unnecessary if pump 246 provides sufficient circulation through conduit 242. Valves 250 through 263 are disposed in conduit 242 and are operative to move between a closed state preventing fluid flow therethrough and an open state allowing fluid flow therethrough.

Figure 3A:
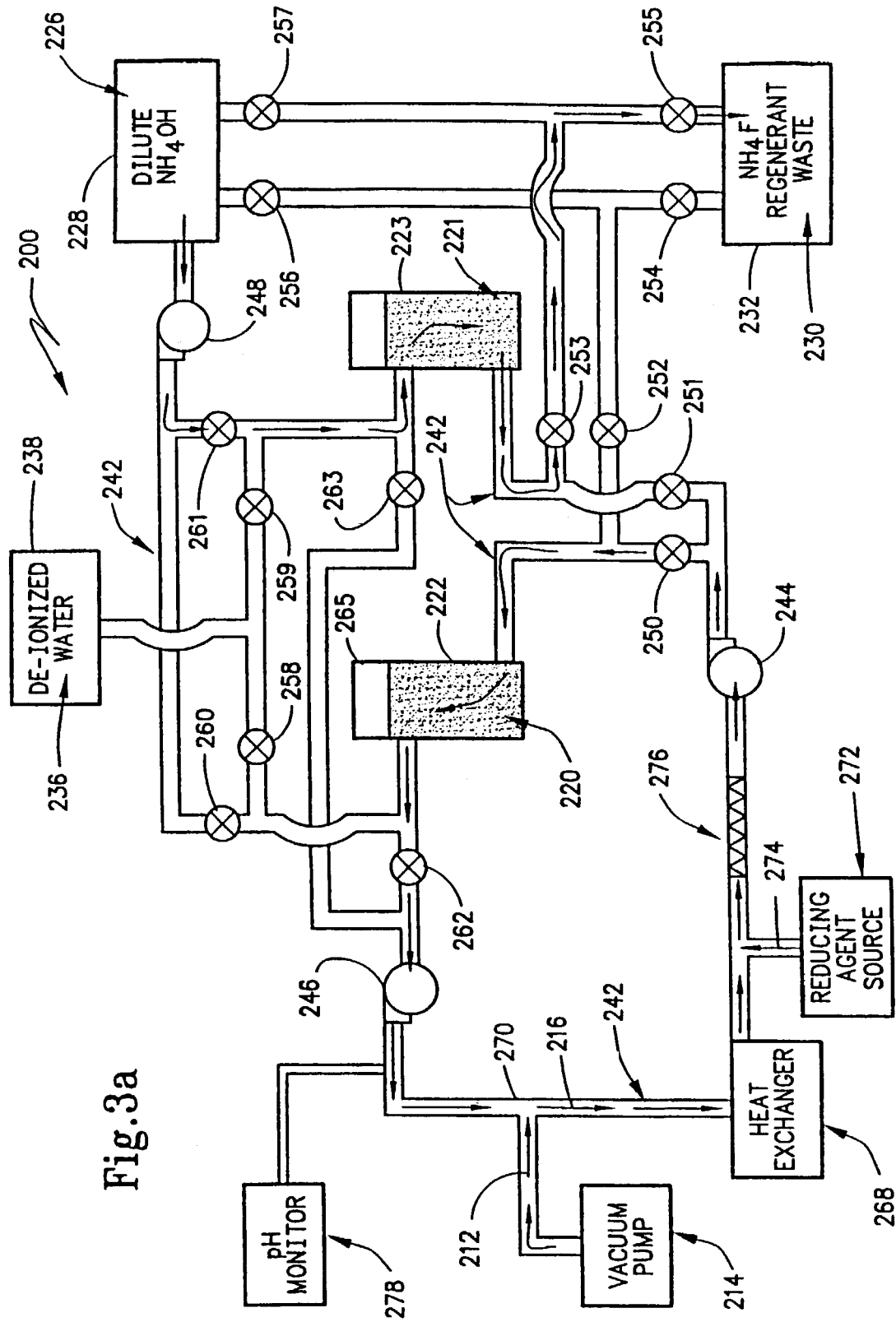
FIG. 3a is a diagrammatic view of a second embodiment of an apparatus according to the present invention, showing a service cycle of a first resin and a regeneration cycle of a second resin.
Figure 3B:
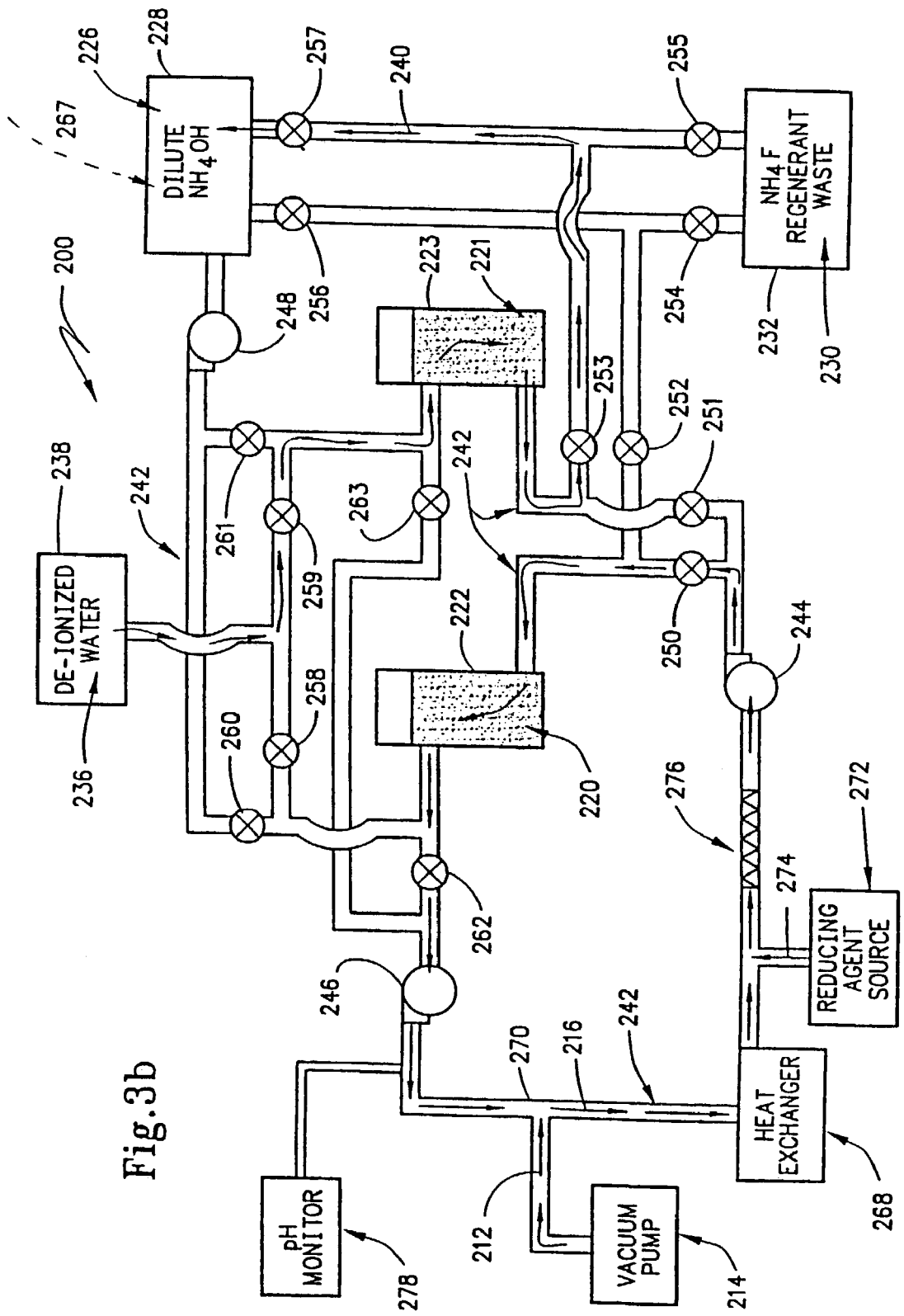
FIG. 3b is a diagrammatic view of the apparatus shown in FIG. 3a, showing a service cycle of the first resin and a rinse/refill cycle of the second resin.

As shown in FIGS. 3a and 3b, first resin vessel 222 can undergo a service cycle while second resin vessel 223 undergoes both a regeneration cycle and a rinse/refill cycle. In particular, as shown in FIG. 3a, pumps 244, 246 and 248 are turned on, valves 250, 253, 255, 261 and 262 are opened and valves 251, 252, 254, 256, 257, 258, 259, 260 and 263 are closed thereby to work a service cycle in first resin vessel 222 and a regeneration cycle in second resin vessel 223. With respect to the service cycle of first resin vessel 222, $F_2$ gas 212 from vacuum pump 214 is injected into water stream 216 which circulates through first resin vessel 222 and undergoes ion-exchange with ion-exchange resin 220. Carrying gas, such as $N_2$ may be removed at free volume 265. Concurrently, dilute $NH_4OH$ 226 from regenerant source vessel 228 is pumped by pump 248 through resin vessel 223 thereby to regenerate ion-exchange resin 221 to form $NH_4F$ regenerant waste 230 which is sent to waste outlet 232.

As shown in FIG. 3b, once ion-exchange resin 221 is regenerated, a rinse/refill cycle begins on second resin vessel 223, while the service cycle continues on first resin vessel 222. Here, pump 248 is turned off, valves 257 and 259 open and valves 255 and 261 close. De-ionized water 236 from rinse source 238 is passed through second resin vessel 223 thereby to rinse away any excess $NH_4OH$ and to form regenerant rinse solution 240 which is passed to regenerant source vessel 228 for reuse in forming the $NH_4OH$ regenerant solution 226. Concentrated $NH_4OH$ 267 may be added to regenerant source vessel 228 to adjust the concentration of $NH_4OH$ regenerant solution 226 as desired.

Once the rinse/refill cycle has completed, valves 259, 253 and 257 are closed and the service cycle continues on first resin vessel 222 until ion-exchange resin 220 is exhausted, as indicated by a signal from pH monitor 278 when the pH of water stream 216 declines below a selected threshold thereby indicating that HF is no longer undergoing ion-exchange with ion-exchange resin 220.

Figure 3C:
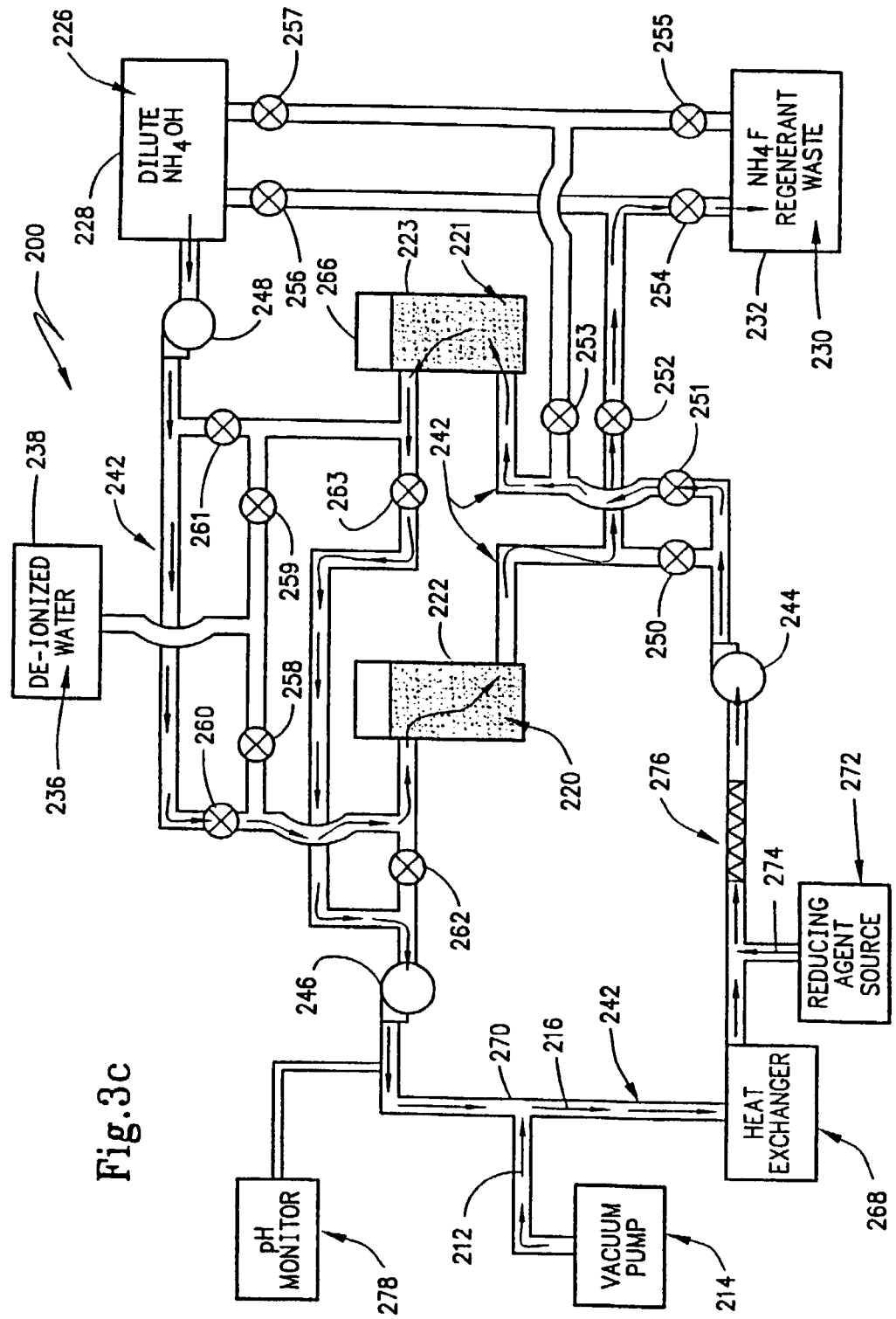
FIG. 3c is a diagrammatic view of the apparatus of FIGS. 3a and 3b, showing a service cycle of the second resin and a regeneration cycle of the first resin.
Figure 3D:
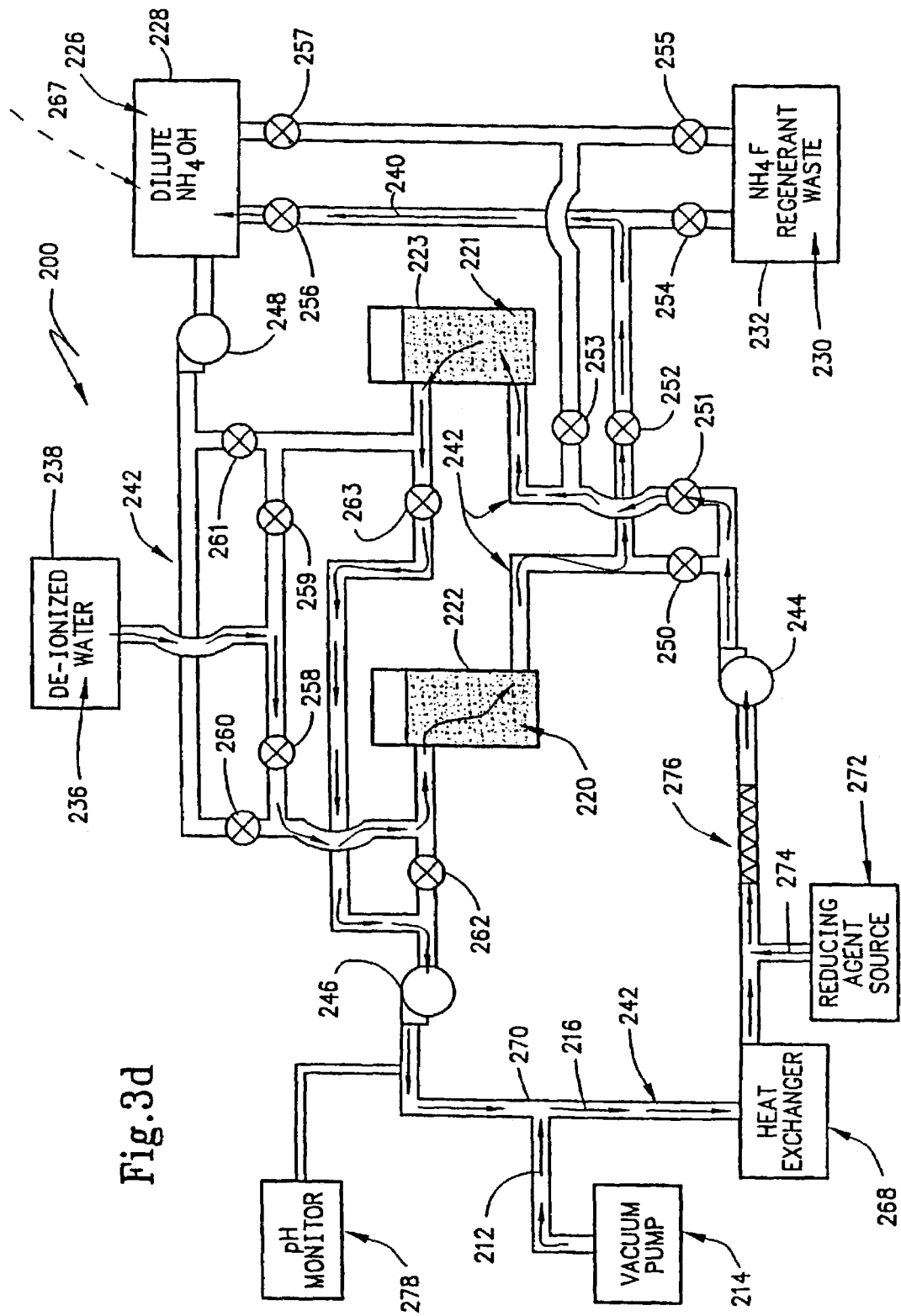
FIG. 3d is a diagrammatic view of the apparatus of FIGS. 3a through 3c, showing a service cycle of the second resin and a rinse/refill cycle of the first resin.

At this time, as shown in FIGS. 3c and 3d, second resin vessel 223 undergoes a service cycle while first resin vessel 222 undergoes regeneration and rinse/refill cycles. In particular, as shown in FIG. 3c, pumps 244, 246 and 248 are turned on, valves 251, 252, 254, 260 and 263 are opened and valves 250, 253, 255, 256, 257, 258, 259, 261, and 262 are closed. With respect to the service cycle through second resin vessel 223, $F_2$ gas from vacuum pump 214 is injected into water stream 216 which circulates through second resin vessel 223 thereby undergoing ion-exchange with ion-exchange resin 221. Carrying gas such as $N_2$ can be removed at free volume 266. First resin vessel 222 undergoes regeneration as dilute $NH_4OH$ is pumped by pump 248 from regenerant source vessel 228 through first resin vessel 222 thereby undergoing ion-exchange with ion-exchange resin 220 to form $NH_4F$ regenerant waste 230 which is sent to waste outlet 232.

As shown in FIG. 3d, once ion-exchange resin 220 is regenerated, pump 248 is turned off, valves 254 and 260 are closed and valves 256 and 258 are opened. Second resin vessel 223 continues undergoing a service cycle. De-ionized water 236 from rinse source 238 passes through first resin vessel 222 thereby to rinse any excess $NH_4OH$ therefrom. The regenerant rinse solution 240 is then passed to regenerant source vessel 228 where it is recycled for use in $NH_4OH$ regenerant solution 226, the concentration of which may be adjusted by addition of concentrated ammonium hydroxide 267.

Once rinse/refill cycle has completed, valves 258, 252 and 256 are closed and the service cycle continues on second resin vessel 223 until ion-exchange resin 221 is exhausted, as indicated by a signal from pH monitor 278 when the pH of water stream 216 declines below a selected threshold thereby indicating that HF is no longer undergoing ion-exchange with ion-exchange resin 220. At this point, a service cycle on first resin vessel 222 and a regeneration cycle on second resin vessel 223 begins again as shown in FIG. 3a.

The various on/off and open/closed states of valves and pumps during the operation cycles for apparatus 200 is summarized in Table 2 below:

TABLE 2

|  | First resin service cycle/ second resin regen. cycle | First resin service cycle/ second resin rinse cycle | Second resin service cycle/first resin regen. cycle | Second resin service cycle/first resin rinse cycle |
| --- | --- | --- | --- | --- |
| Pump 244 | ON | ON | ON | ON |
| Pump 246 | ON | ON | ON | ON |
| Pump 248 | ON | OFF | ON | OFF |
| Valve 250 | OPEN | OPEN | CLOSED | CLOSED |
| Valve 251 | CLOSED | CLOSED | OPEN | OPEN |
| Valve 252 | CLOSED | CLOSED | OPEN | OPEN |
| Valve 253 | OPEN | OPEN | CLOSED | CLOSED |
| Valve 254 | CLOSED | CLOSED | OPEN | CLOSED |
| Valve 255 | OPEN | CLOSED | CLOSED | CLOSED |
| Valve 256 | CLOSED | CLOSED | CLOSED | OPEN |
| Valve 257 | CLOSED | OPEN | CLOSED | CLOSED |
| Valve 258 | CLOSED | CLOSED | CLOSED | OPEN |
| Valve 259 | CLOSED | OPEN | CLOSED | CLOSED |
| Valve 260 | CLOSED | CLOSED | OPEN | CLOSED |
| Valve 261 | OPEN | CLOSED | CLOSED | CLOSED |
| Valve 262 | OPEN | OPEN | CLOSED | CLOSED |
| Valve 263 | CLOSED | CLOSED | OPEN | OPEN |

Figure 4:
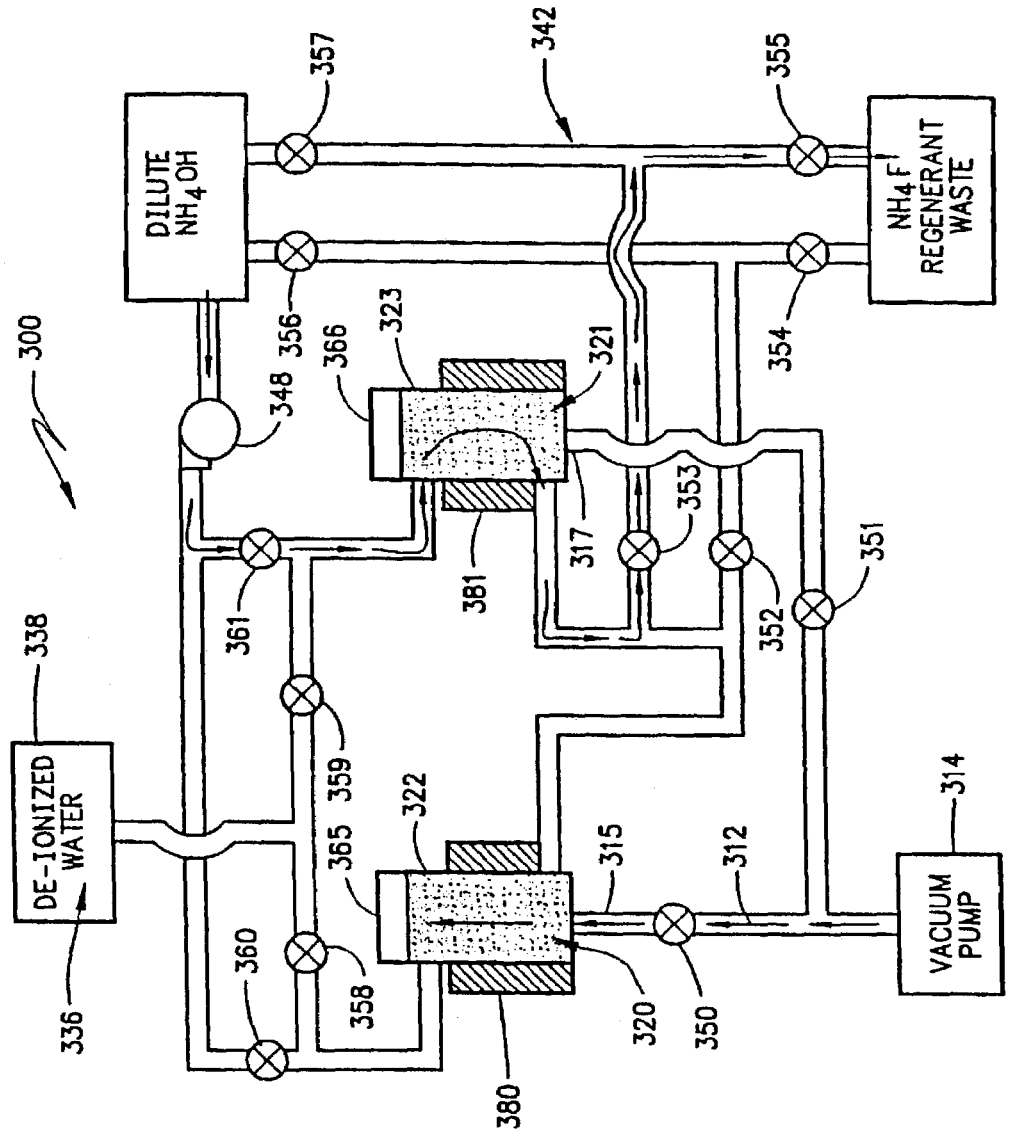
FIG. 4 is a diagrammatic view of a third embodiment of an apparatus according to the present invention.

A third embodiment of apparatus 300 is shown in FIG. 4. Here, service, regeneration and rinse/refill cycles operate similarly to the dual resin embodiment of FIGS. 3a-3d. FIG. 4 shows operation that corresponds to FIG. 3a for the second embodiment of the apparatus, showing a service cycle of first resin vessel 322 having ion-exchange resin 320 disposed therein, and a regeneration cycle of second resin vessel 323 having ion-exchange resin 321 disposed therein. However, in this embodiment, during a service cycle of one of resin vessels 322 or 323, $F_2$ gas 312 is injected from vacuum pump 314 directly into the resin bed of one or the other of ion-exchange resins 320 and 321, which each contain a volume percentage of water of preferably approximately 42%. Again, the preferred resin is a resin containing pyridine functional groups, such as the crosslinked poly-4-vinylpyridine resins manufactured by Reilly. The pyridine resins are very stable such that $F_2$ generally will not hurt their structure by oxidation.

As shown in FIG. 4, outlets 315 and 317 of vacuum pump 314 are attached to the bottom of each of resin vessels 322 and 323, respectively, and valves 350 and 351 direct $F_2$ gas 312 to either resin vessel. In this embodiment, there is sufficient water in the ion-exchange resins 320 and 321, respectively, for the reaction of $F_2$ and water that forms HF to take place. Preferably, cooling jackets 380 and 381 are respectively disposed proximate to resin vessels 322 and 323, thereby to dissipate any heat generated by the reaction of $F_2$ and water. Again, excess carrying gas, such as $N_2$, may be removed at the free volumes 365 and 366 disposed in resin vessels 322 and 323 respectively.

The ion-exchange resins 320 and 321 will become rehydrated during their respective regeneration cycles, given that the regeneration cycle is an aqueous cycle. However, if a selected type of resin contains insufficient water for the HF reaction to take place until the resin is exhausted with $F^-$, it may be necessary to provide a separate rehydration cycle to either of ion-exchange resins 320 and 321 during their respective service cycles by providing de-ionized water 336 from rinse source 338 through valves 358 or 359. Alternatively, moisture may be injected in vapor form from an external source into resin vessels 322 and 323 during their respective service cycles, thereby to provide sufficient water for the reaction.

The various on/off and open/closed states of valves and pumps during the operation cycles for apparatus 300 is summarized in Table 3 below:

TABLE 3

| | First resin service cycle/ second resin regen. cycle | First resin service cycle/ second resin rinse cycle | Second resin service cycle/first resin regen. cycle | Second resin service cycle/first resin rinse cycle |
|---|---|---|---|---|
| Pump 348 | ON | OFF | ON | OFF |
| Valve 350 | OPEN | OPEN | CLOSED | CLOSED |
| Valve 351 | CLOSED | CLOSED | OPEN | OPEN |
| Valve 352 | CLOSED | CLOSED | OPEN | OPEN |
| Valve 353 | OPEN | OPEN | CLOSED | CLOSED |
| Valve 354 | CLOSED | CLOSED | OPEN | CLOSED |
| Valve 355 | OPEN | CLOSED | CLOSED | CLOSED |
| Valve 356 | CLOSED | CLOSED | CLOSED | OPEN |
| Valve 357 | CLOSED | OPEN | CLOSED | CLOSED |
| Valve 358 | CLOSED | CLOSED | CLOSED | OPEN |
| Valve 359 | CLOSED | OPEN | CLOSED | CLOSED |
| Valve 360 | CLOSED | CLOSED | OPEN | CLOSED |
| Valve 361 | OPEN | CLOSED | CLOSED | CLOSED |

It should be appreciated that in this embodiment, it is possible to remove the T-shaped portion of conduit 342 shown in FIG. 4 that includes valves 353, 355 and 357, such that the apparatus only utilizes—for the regeneration and rinse/refill cycles of both resin vessels—the T-shaped portion of conduit 342 that includes valves 352, 354 and 356.

Figure 5:
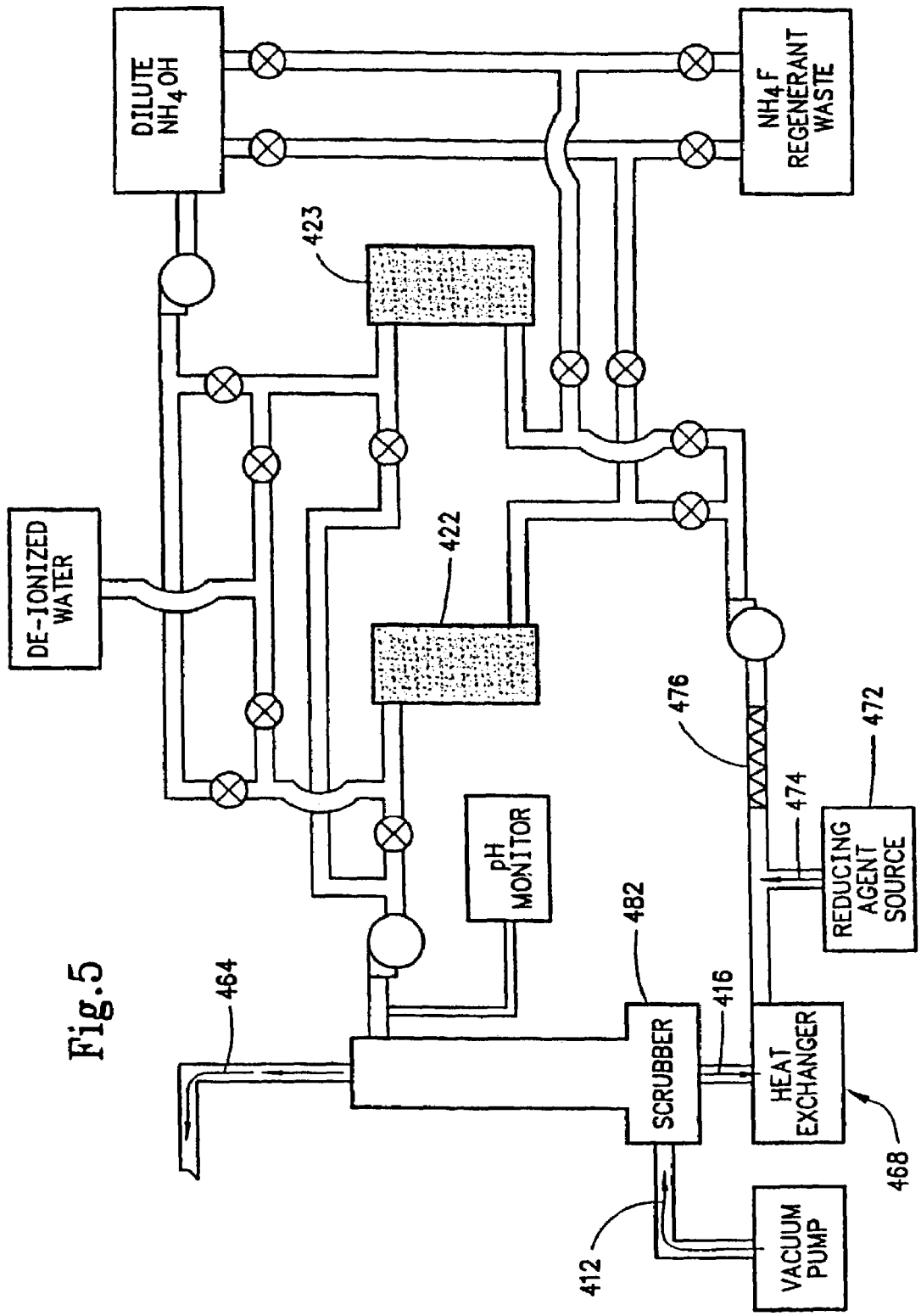
FIG. 5 is a diagrammatic view of a fourth embodiment of an apparatus according to the present invention.

As shown in FIG. 5, a fourth embodiment of the apparatus 400 according to the present invention may be seen as an attachment to existing conventional scrubbers, such as are currently used by the semi-conductor manufacturing industry. Here, the $F_2$ gas 412, again typically mixed with a 40:1 ration of $N_2$, would be brought into a scrubber 482, thereby to generate HF by reaction with water. The water stream 416 from the scrubber is then cooled with heat exchanger 468, and a reducing agent 474 from reducing agent source 472 is injected into water stream 416 to assure decomposition of HOF, and further mixing may be provided by mixer 476. Operation of the service, regeneration and rinse/refill cycles of the apparatus 400 are similar to that discussed with respect to the apparatus 200 of FIGS. 3a-3d. Here, it should be noted that resin vessels 422 and 423 need not include any free volume for removing carrying gases such as $N_2$, given that such gases 464 are removed by scrubber 482 and can be transported for further processing. A closed loop operation of water stream 416 is preferred, which allows for higher flow rates through the scrubber 482 and accordingly more efficient scrubbing.

In all embodiments of the present invention, it may desirable to remove any $SiO_2$ or other compounds of silica in the waste stream. That is, since HF in the semiconductor industry is used extensively for silicon wafer etching, and is also a product of the scrubbing of excess $F_2$ gas in the chamber clean process, there is generally $SiO_2$ and other silica compounds in the waste stream. Due to the low pH, these compounds form gelatinous solids, or colloidal silica, generally in concentrations of 300-400 ppm. Such particles are generally difficult to remove using conventional filtration methods. Accordingly, to remove such silica particles in the waste stream, the present invention contemplates the use of a strong base anion resin of high porosity, such as the Purolite 501-P and equivalent resins, to filter silica particles from the solution. These resins have a "filtration" functionality in view of their porosity, but also have the advantage of capturing silica particles on account of the anion-resin charge. Such resins can be used as a first step in the treatment process, prior to removing the fluoride ion in the solution by ion-exchange. It should be understood that the high porosity resins can be incorporated in disposable cartridges that can be replaced as necessary with fresh cartridges containing the resin. Alternatively, the high porosity resins can be disposed in resin vessels through which the silica containing solution is passed; in such case, the resins can be regenerated with the same regenerant solution used to regenerate the HF removal resin.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A method for removing fluorine gas from a gas stream from a semiconductor manufacturing process, comprising:
   providing a gas stream comprising fluorine gas;
   providing an ion-exchange resin containing water;
   contacting said gas stream comprising fluorine gas with the water in said ion-exchange resin, thereby generating hydrofluoric acid;
   wherein fluoride ions in said hydrofluoric acid are exchanged for selected ions in said ion-exchange resin.

2. A method according to claim 1 wherein the ion-exchange resin is a weak-base anion exchange resin or a strong base anion exchange resin.

3. A method according to claim 2 wherein the ion-exchange resin is a crosslinked poly-4-vinylpyridine resin or derivative thereof.

4. A method according to claim 1 wherein the ion-exchange resin includes pyridine functional groups.

5. A method according to claim 4 wherein the ion-exchange resin is a crosslinked poly-4-vinylpyridine resin or derivative thereof.

6. A method according to claim 1 wherein the generated hydrofluoric acid contains $OF_2$ or $H_2O_2$.

7. A method according to claim 1 wherein contacting said gas stream comprising fluorine gas with the water in said ion-exchange resin is a continuous process.

8. A method according to claim 1 wherein the ion-exchange resin is doped with an electron donor catalyst.

9. A method according to claim 8 wherein the catalyst is palladium or titanium.

10. A method according to claim 1 further comprising regenerating the ion-exchange resin with a regenerant solution and rinsing the ion-exchange resin with a rinse solution.

11. A method according to claim 10 wherein the regenerant solution is ammonium hydroxide and the rinse solution is de-ionized water.

12. A method according to claim 1 further comprising cooling the hydrofluoric acid.

13. A method according to claim 12 wherein said ion-exchange resin and said hydrofluoric acid are contained in a vessel, and said hydrofluoric acid is cooled by contacting said vessel with a heat exchanger apparatus.

14. A method according to claim 1 wherein the hydrofluoric acid has a pH between 5 and 7.

* * * * *